United States Patent Office 3,464,957
Patented Sept. 2, 1969

3,464,957
NOVEL POLYAMIDES OF ADAMANTANE
Gary L. Driscoll, Boothwyn, Pa., assignor to Sun Oil Company, Philadelphia, Pa., a corporation of New Jersey
No Drawing. Continuation-in-part of application Ser. No. 609,286, Jan. 16, 1967. This application Oct. 30, 1967, Ser. No. 679,199
Int. Cl. C08g 20/20
U.S. Cl. 260—78                             11 Claims

ABSTRACT OF THE DISCLOSURE

Polyamides are prepared by the condensation of an adamantane of the structure

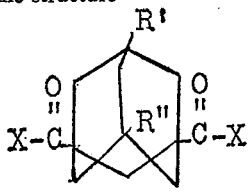

and an organic diamine of the structure $H_2N$—R—$NH_2$ where R' and R" are hydrogen or hydrocarbon radicals and R is a bivalent organic radical and X is —OH, —Cl or —Br. For example, 1,3-dimethyladamantane-5,7-diacyl chloride and hexamethylene diamine are reacted to produce a polyamide of inherent viscosity of 1.49. The polyamides of the invention are useful for forming films and sheets which can be used generally as pervious polymer films and sheets, i.e., for wrapping, display and structural and architectural design. The polyamides can also be drawn into fibers which can be employed for textiles, carpeting and tire cord.

---

This application is a continuation-in-part of application Ser. No. 609,286, filed Jan. 16, 1967, now abandoned.

SUMMARY OF THE INVENTION

The present invention relates to novel polyamides and the method of their preparation. More particularly, the invention relates to linear copolymers produced from adamantane and substituted adamantane diacids and diacyl halides.

DESCRIPTION OF THE INVENTION

Adamantane (tricyclo-[3.3.1.1³,⁷]decane) has a carbon structure containing ten carbon atoms arranged in a completely symmetrical, strainless manner, wherein four of the carbon atoms are in bridgehead positions in the rings. The typographical structure of adamantane is often represented as:

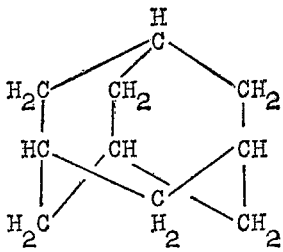

There are four tertiary hydrogen atoms, one at each bridgehead carbon atom. All four bridgehead carbon atoms are equivalent to each other and likewise all rings are equivalent.

Polyamides prepared from adamantane derivatives are shown in the copending application Ser. No. 542,229 filed Apr. 13, 1966, by Duling et al.

The polymers of the present invention can be described as linear polyamides comprising a dibasic adamantane having the structure

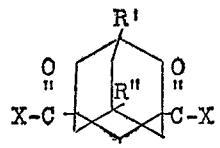

and an organic diamine of the structure $H_2N$—R—$NH_2$ where R' and R" are radicals having 0 to 20 carbon atoms selected from the group consisting of hydrogen and hydrocarbyl, X is a radical selected from the group consisting of hydroxy, chloro and bromo and R is a bivalent organic radical.

Preferable polyamides according to the present invention comprise substituted adamantanes having the structure

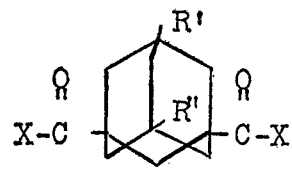

where R' is a radical having 0 to 20 carbon atoms selected from the group consisting of hydrogen, alkyl, cycloalkyl and aryl, R" is a radical having 1 to 20 carbon atoms selected from the group consisting of alkyl, cycloalkyl and aryl, X is a radical selected from the group consisting of hydroxy, chloro and bromo with an organic diamine $H_2N$—R—$NH_2$ where R is a bivalent organic radical. A preferred R is a radical having 2 to 20 carbon atoms selected from the group consisting of alkylene, cycloalkylene and arylene. A still further preferred polymer is one where X is chloro. This as will be explained below is the result of the preferred process where the diacyl chloride is the preferred reactant.

The term hydrocarbyl is used to designate a hydrocarbon radical which can be from the group alkyl, cycloalkyl, aryl, alkaryl, aralkyl, alkcycloalkyl, cycloalkalkyl, cycloalkaryl, arcycloalkyl and any combination of hydrocarbon radicals. Some examples of the above radicals are methyl-, cyclohexyl-, phenyl-, benzyl-, tolyl-, methylhexyl-, hexylethyl-, cyclopropylphenyl-, phenylcyclohexyl-, and the like. The above hydrocarbyl radicals are attached at either the 1 or 3 positions or both on the adamantane molecule.

The adamantane starting material used to produce the polyamides of the present invention has the general formula

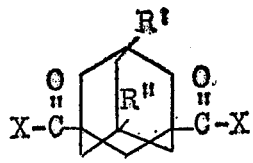

where R', R" and X have the significance previously given.

The alkyl- or cycloalkyl-adamantane compounds can be produced according to the method disclosed by Schneider et al., Journal of the American Chemical Society, volume 86, pages 5365–5367. The arylated adamantane compounds can be produced by reacting a bromo-adamantane with an excess of the aromatic compound in a procedure such as that shown by Stetter et al., Ber.; 97 (12) 3488–92 (1964).

The substituted adamantanes for the present invention can have either non-branched or branched alkyl groups and can have one or more cycloalkyl or aryl radicals in the substituted adamantane moiety with a total number of carbon atoms in each R' and R" group ranging up to 20. The diacids of the 1–10 carbon atom alkylated adamantanes can be produced by reacting the dibromo or dichloro parent hydrocarbon with formic acid in the presence of fuming sulfuric acid and hydrolysis of the product according to the procedure disclosed in U.S. Patent 3,356,718, issued Dec. 5, 1967 to Robert E. Moore. This procedure will also produce the diacids of the alkylated, cycloalkylated and arylated adamantanes having up to 20 carbon atoms in the substituent group.

The diacyl chloride is easily prepared by conventional procedures for example oxalyl chloride added dropwise to the adamantane diacid using a slight excess of oxalyl chloride. The mixture is then refluxed for about two hours and excess oxalyl chloride removed. The diacyl chloride crystallizes on cooling and is recrystallized from hexane, filtered and dried. Thionyl chloride can be used in the preparation. The acyl bromide can be prepared by reacting the diacid with phosphorus tribromide.

Examples of such polymerization reactants are the 5,7-dicarboxyl, 5,7-diacyl chloride or 5,7-diacyl bromide derivatives of the following hydrocarbons:

1-methyladamantane; or
1-ethyladamantane;
1,3-dimethyladamantane;
1-methyl-3-ethyladamantane;
1,3-diethyladamantane;
1-n-propyl- or 1-isopropyladamantane;
1-n-butyladamantane;
1,3-di-n-pentyladamantane;
1-methyl-3-heptyladamantane;
1-n-decyladamantane;
1-n-decyl-3-ethyladamantane;
1-methyl-3-propyladamantane;
1-iso-hexyladamantane;
1-methyl-3-cyclohexyladamantane;
1-phenyladamantane;
1-methyl-3-phenyladamantane;
1,3-diphenyladamantane and the like.

In regard to the structures given above, it should be noted that of the substituents specified at the bridgehead positions of the adamantane moiety only R' may be a hydrogen atom. Thus, in any composition according to the invention, there will be at most only one tertiary hydrogen atom in each adamantane moiety. Even more preferred compositions have no tertiary hydrogen atom in the adamantane moiety, thus in the more preferred compositions R' will be either an alkyl, cycloalkyl or aryl group. Most preferably because of the ease with which they may be obtained, the bridgehead substituents will be methyl or ethyl groups or both.

The linear polyamides are produced by the condensation of substituted dibasic adamantanes as described above with an organic diamine. The organic diamines are characterized by the formula $H_2N-R-NH_2$ wherein R, the bivalent radical, can be selected from the following: aromatic, aliphatic, cycloaliphatic, combination of aromatic and aliphatic, heterocyclic, bridged organic radicals wherein the bridge is oxygen, nitrogen, sulfur, silicone or phosphorous, and substituted groups thereof. Such substituents include ether, sulfide, ketone, amide, halogen and the like wherein the substituent does not interfere in the polymerization. The preferred R group is a radical having 2 to 20 carbon atoms selected from the group consisting of alkylene, cycloalkylene and arylene.

A preferred R is an alkylene radical having 2 to 12 carbon atoms. Among the diamines which are suitable for use in the present invention are:

ethylenediamine;
propylenediamine;
tetramethylenediamine;
pentamethylenediamine;
hexamethylenediamine;
heptamethylenediamine;
octamethylenediamine;
nonamethylenediamine;
decamethylenediamine;
3-methylhexamethylenediamine;
3-methylheptamethylenediamine;
4,4-dimethylheptamethylenediamine;
2,11-diaminododecane;
1,12-diaminooctadecane;
2,2-dimethylpropylenediamine;
2,5-dimethylhexamethylenediamine;
3,3-diaminodipropyl ether;
triglycoldiamine;
3,3'-diaminodipropylamine;
1,2-bis-(3-aminopropoxy)ethane;
3-methoxyhexamethylenediamine;
3,3'-diaminodipropyl sulfide;
1,4-diaminocyclohexane;
p-menthane-1,8-diamine;
bis(para-aminocyclohexyl)methane;
meta-phenylenediamine;
para-phenylenediamine;
4,4'-diaminodiphenyl propane;
4,4'-diaminodiphenyl methane;
benzidine;
4,4'-diaminodiphenyl sulfide;
4,4'-diaminodiphenyl sulfone;
3,3'-diaminediphenyl sulfone;
4,4'-diaminodiphenyl ether;
2,6-diaminepyridine;
bis-(4-aminophenyl)diether silane;
bis-(4-aminophenyl)phosphine oxide;
bis-(4-aminophenyl)-N-methylamine;
1,5-diaminonaphthalene;
3,3'-dimethyl-4'-diaminobiphenyl;
3,3'-dimethoxy benzidine;
2,4-bis-(beta-amino-t-butyl)toluene;
bis-(para-beta-amino-t-butylphenyl)ether;
para-bis-(2-methyl-4-aminopentyl)benzene;
para-bis-(1,1-dimethyl-5-aminopentyl)benzene;
m-xylylene diamine;
p-xylylene diamine;
1,3-diamino-5,7-dimethyladamantane and the like.

The polyamides of the present invention have inherent viscosities in the range of .05 to 2.0. The inherent viscosity ($\eta_{inh.}$) is indicative of the degree of polymerization and is used herein as a measure thereof. Inherent viscosity is represented by the equation:

$$\eta \text{ inherent} = \ln \frac{\eta \text{ relative}}{C}$$

where $\eta$ relative $= t/t_0$
$t_0 =$ flow time through a viscometer of a liquid reference
$t =$ flow time through the same viscometer of a dilute solution of polymer in the reference liquid
$C =$ concentration of polymer in solution expressed in grams/deciliter Inherent viscosities ($\eta_{inh.}$) unless otherwise specified is determined in the instant specification and claims by a 0.5% solution of polyamide in m-cresol.

Three methods were employed to produce the present polyamides. These were interfacial polycondensation, "nylon salt" polymerization and emulsion polycondensation. Although the interfacial and "nylon salt" techniques produced satisfactory polymers these were generally of low inherent viscosity, i.e., low molecular weight. The emulsion polycondensation technique is preferred because of the reproducibility of the results, simplicity of operation and suitability for producing high molecular weight polymers. The method employed is generally that of Sokolov, Vysokomol. Soedin., 1965, 7, 601 and Sokolov and Kudim, ibid., 1965, 7, 634, 1899.

Examples of all three processes are included, however, the emulsion process will be discussed in detail.

Basically the technique involves using a two-phase system. The two phases would be an organic solvent phase and a water phase. The organic solvent can be for example tetrahydrofuran, 2,4-dimethylsulfolane or dioxane. The adamantane diacyl halide is dissolved in the organic solvent which is added to the water phase over a short period of time with high speed stirring. Both the organic solvent and water phases are cooled prior to mixing to a temperature in the range of 5° to 30° C. The water phase contains a solution of organic diamine and an acid acceptor such as sodium carbonate, magnesium oxide or the like. The solvent phase is added to the water phase in a period of 20 to 40 seconds with high speed stirring for example 12,000 to 20,000 r.p.m. The concentration of reactants is generally equal molar although an excess of either component, i.e., mole ratios of diamine to diacyl halide in the range of 2:1 to 1:5, can be employed. When equal molar concentrations of reactants are employed, the concentrations typically range from 0.05 to .5 molar. The acid acceptor can be used in an equimolar amount up to an excess of three moles of acceptor per mole of diacyl halide preferably two moles per mole of diacyl halide. The high speed stirring is continued for about 5 minutes after completion of the addition.

Table I shows a 1,3-dimethyladamantane-5,7-diacyl chloride and 1,6-diaminohexane polyamide. Even very low molecular weight polymers exhibit exceptionally good flexural strengths.

TABLE I

| Sample ($\eta_{inh}$) | Flexural Strength* (p.s.i.×10³) | Flexural Modulus* (p.s.i.×10⁵) |
|---|---|---|
| 0.26 | 9.13 | 5.77 |
| 0.58 | 9.45 } 10.62 | 4.59 |
| 0.59 | 11.80 | 6.22 |
| 1.30 | 16.45 (mean of Two) | 4.15 |
| 1.46 | 14.5 (mean of Three) | 4.80 |

*Flexural strength and modulus were determined at room temperature, according to B.S. 2782, Method 304B using a span of 1 inch and a testing speed of 0.3 inch per minute.

Polyamides have special interest because of their excellent flexural strengths compared, for example, to common thermoplastic material in Table II.

TABLE II

| Material | Flexural Strength (p.s.i.) | Flexural Modulus (p.s.i.) |
|---|---|---|
| Nylon 66 | 8-13.8×10³ | 2.6-4.0×10⁵ |
| Polyacetals | 14.1×10³ | 4.1×10⁵ |
| Polycarbonates | 11-13×10³ | 3.2×10⁵ |

The polyamides of the invention also have excellent hydrolytic stability as shown in Table II A.

TABLE II A

| Type of Polymer Components | | Viscosity $\eta_{inh}$ | 6N-1 H₂SO₄, percent wt. loss | 6N-1 NaOH, percent wt. loss |
|---|---|---|---|---|
| Acid | Diamine | | | |
| 1. Ad* | Hexamethylenediamine | 0.615 | 5 | 0 |
| 2. Ad* | 1,4-bis(aminomethyl)cyclohexane | 0.32 | 4 | 1 |
| 3. Ad* | 1,3-dimethyl-5,7-diaminoadamantane | 0.10 | 2 | 3 |
| 4. Ad* | Meta-phenylenediamine | 0.14 | 16 | 0 |
| 5. Nylon 66 | | over 1.0 | (²) | |

*1,3-dimethyladamantane-5,7-diacyl chloride.
¹ Sample boiled for 24 hours and weight loss recorded.
² Dissolves in 2 hrs.

The polyamides 1-4 lost no more than 4% weight when held in boiling water for 24 hours.

In order to obtain the high molecular weight polyamides certain effects regarding the reaction variables should be considered. Trends related to the variation of individual reaction conditions have been observed and set out in the examples.

Certain ratios of reactants and certain reaction conditions have been specified in the examples. It will be understood of course that the reaction variables are more or less interdependent and that when one is arbitrarily fixed the limits within which the others may be varied are somewhat restricted. The more desirable ranges and relationships can be ascertained from the specific examples presented hereinafter. For any particular application of the invention, the most desirable conditions can be readily determined by trial by one skilled in the art, such a determination being facilitated by the trends of these variables presented in the examples.

Example 1.—Emulsion condensation

A solution of 1,3-dimethyladamantane-5,7-diacyl chloride (8.229 g., 0.02845 mole) (hereinafter this material will be designated as DMA diacyl chloride) in tetrahydrofuran (86.0 ml.) was cooled in a refrigerator for one hour to a temperature of about 10° C. and then added over a 15 second period of time to a vigorously stirred (Sunbeam blender, 18,000 r.p.m.) solution of 1,6-diaminohexane (3.297 g., 0.02837 mole) and sodium carbonate (6.025 g., 0.0568 mole) in water (86 ml.). The aqueous solution was cooled beforehand to 4° C. Stirring was continued for five minutes after the completion of addition, the final temperature being 20.5° C. The product was collected, washed with water until the filtrate was chloride-free and then washed with ethanol (500 ml.) and dried at 60–90° C. in vacuo. The yield was 8.002 g. (84.8%) of a polyamide having a melting point greater than 210° C., inherent viscosity ($\eta_{inh}$) of 0.96 (0.5% solution in m-cresol or in 98% sulfuric acid). A sample of this material was molded at 170° C. and 4,000 p.s.i. pressure to give a 0.5 inch disk having Barcol hardness of 78.

Example 2.—Purification of polyamide 1.00 g. of the crude polyamide prepared in Example 1 was extracted with refluxing ethanol for 24 hours. The weight loss was 0.354 g. (35.4%). The residue had an inherent viscosity of 1.27 (.5% in m-cresol). Treatment of the ethanol extract with water yielded a material with $\eta_{inh}$ of 0.33.

In Examples 3 through 7, two moles of sodium carbonate per mole of DMA diacyl chloride were used as the acid acceptor.

Example 3.—Effect of reactant concentration

A series of runs were made to determine the effect of the concentration of reactants. In each of the runs in Table III, the concentrations of DMA diacyl chloride and 1,6-diaminohexane were equal but this concentration was varied from run to run by changing the volume of tetrahydrofuran and water. The procedures set out below for one molar concentration were repeated for each run with only the amount of tetrahydrofuran and water being adjusted in order to achieve the desired concentration.

A solution of DMA diacyl chloride (4.338 g., 0.015 mole) in tetrahydrofuran (150 ml.) was cooled in the refrigerator to about 10° C. and then added during 32 seconds with stirring (18,000 r.p.m.) to a solution of 1,6-diaminohexane (1.741 g., 0.015 mole) and sodium carbonate (3.180 g., 0.03 mole) in water (150 ml.), which had been cooled to 10° C. Stirring was continued for a further 5 minutes, after which the temperature had risen to 34.5° C. The product was collected, washed with ethanol (250 ml.), then with water until the filtrate was chloride-free,, and finally with ethanol (250 ml.), and dried at 80° C. in vacuo. Yield 2.595 g. (52%). The product melted gradually above about 220° C. (under nitrogen) and had $\eta_{inh.}$ 1.29.

The effect of varying reactant concentration is shown below.

TABLE III

| Conc. of reactants (molar): | Product yield (percent) | $\eta_{inh.}$ |
|---|---|---|
| 0.05 | 54.4 | 1.18 |
| 0.1 | 52.0 | 1.29 |
| 0.175 | 64.2 | 1.45 |
| 0.25 | 54.0 | 1.13 |
| 0.331 | 68.0 | 0.93 |

Example 4.—Effect of variation of diacyl chloride concentration

The procedure of Example 3 was repeated except that in each case the diamine concentration was 0.1 molar, while the concentration of diacyl chloride was varied. Table IV shows the results.

TABLE IV

| Acid chloride conc. (molar): | Product yield (percent) | $\eta_{inh.}$ |
|---|---|---|
| 0.05 | 32.5 | * 0.26 |
| 0.1 | 52.0 | 1.29 |
| 0.5 | 31.5 | * 0.58 |

*Material of even lower viscosity was precipitated from the filtrates during isolation of these products.

Example 5.—Effect of variations of addition time

Three runs were performed using the procedure of Example 3 wherein both reactants were at 0.1 molar concentration except that the time taken to mix the reactants was varied as shown in Table V.

TABLE V

| Time (sec.): | Product yield (percent) | $\eta_{inh.}$ |
|---|---|---|
| Approx. 2 | 63.6 | 1.18 |
| 32 | 52.0 | 1.29 |
| 70 | 60.1 | 1.29 |

Example 6.—Effect of variations of temperature

Three runs were performed following the procedure of Example 3 wherein both reactants were of 0.1 molar concentration except that the initial temperatures of both reactant solutions were varied as shown in Table VI.

TABLE VI

| Temp. (° C.): | Product yield (percent) | $\eta_{inh.}$ |
|---|---|---|
| 10 | 52.0 | 1.29 |
| 20 | 58.2 | * 1.49 |
| 30 | 57.0 | 1.43 |

*Hot extraction of this product with ethanol for 24 hours yielded a residue with $\eta_{inh.}$ 1.80.

Example 7.—Effect of excess of diacyl chloride

The procedure of Example 3 was repeated in these runs with the moles of diacyl chloride and diamine being adjusted as indicated in Table VII.

TABLE VII

| | Diacyl Chloride | | | Diamine | | Add. Time, Sec. | Product yield, percent | $\eta_{inh.}$ |
|---|---|---|---|---|---|---|---|---|
| | Moles | Conc. (molar) | Excess (percent) | Moles | Conc. (molar) | | | |
| (a) | .0153 | 0.1 | 2 | .015 | 0.1 | 2 | 63.3 | 1.17 |
| (b) | .0165 | 0.1 | 10 | .015 | 0.1 | 33 | 56.6 | 1.14 |
| (c) | .0182 | 0.331 | 10 | .0165 | 0.331 | 10 | 51.8 | 0.92 |

Example 8.—One mole of acid acceptor per mole of diacyl chloride

The procedure of Example 3 was repeated with the following proportions and conditions:

| | | |
|---|---|---|
| DMA diacyl chloride (10% excess) | mole | 0.0165 |
| THF | ml | 165 |
| Diamine | mole | 0.015 |
| Sodium carbonate | do | 0.0165 |
| Water (reagents both 0.1 molar) | ml | 150 |
| Initial temperature | ° C | 9 |
| Addition time | seconds | 28 |
| Product yield | percent | 41.9 |
| $\eta_{inh.}$ | | 0.93 |

Example 9.—Magnesium oxide as acid acceptor

Procedure of Example 3 was repeated using 0.015 mole of each reagent and 150 ml. each of THF and water to give 0.1 molar solution. Sodium carbonate was replaced with magnesium oxide (0.03 mole). The initial temperature of both solutions was 9.5° C. and the addition time was 30 seconds. The product was washed successively with ethanol (250 ml.), N-hydrochloric acid (300 ml.), water (until the filtrate was chloride-free) and ethanol (100 ml.) and dried as usual. Yield: 25.1% $\eta_{inh.}$ 0.86.

Example 10.—Use of 2,4-dimethylsulpholane

In this example, reagent concentrations were 0.331 molar. A solution of 0.0149 mole of DMA diacyl chloride in 45 ml. of 2,4-dimethylsulpholane (dried and distilled) was added over a 16 second period to a solution of 1,6-diaminohexane (0.0149 mole) and sodium carbonate (0.0298 mole) and 45 ml. of water. Initial temperature of the solution was 10° C. The product was collected, washed and dried as in Example 4. Yield: 3.1%, $\eta_{inh.}$: 1.19.

Example 11.—Emulsion polycondensation

The procedure of Example 3 was followed using a metaphenylene diamine and DMA diacyl chloride in the molar concentrations indicated in Table VIII. The reactants are present in equal mole amounts. Sodium carbonate was used as the acceptor at 2 moles per mole of diacyl chloride. The initial temperature was about 10° C. Films were cast from m-cresol solutions of the polyamide having $\eta_{inh.}$ of 0.75. At room temperature this film had tensile strength of $0.95 \times 10^4$ p.s.i. and elongation of 16% at break.

TABLE VIII

| Reactants conc. (molar):* | Product yield (percent) | $\eta_{inh}$ |
|---|---|---|
| 0.05 | 81 | 0.41 |
| 0.1 | 87 | **0.75 |
| 0.15 | 81 | 0.51 |

*Neither reactant in excess.
**Repeated at 20°, this reaction gave the polyamide in 75% yield, $\eta_{inh}$, 0.55.

Example 12.—Emulsion polycondensation

The procedure of Example 3 was repeated using 1,3-diamino-5,7-dimethyladamantane as the diamine in the molar concentrations indicated in Table IX. The reactants arep resent in equal mole amounts. Sodium carbonate was used as the acceptor at 2 moles per mole of diacyl chloride. The initial temperature was about 10° C.

TABLE IX

| Reactants conc. (molar):* | Product yield (percent) | $\eta_{inh}$ |
|---|---|---|
| 0.05 | 65 | 0.15 |
| 0.1 | 70 | 0.17 |
| 0.15 | 80 | 0.19 |
| 0.25 | 42.5 | 0.25 |

Example 13.—Interfacial polycondensation

Water (150 ml.), hexamethylene diamine (20 g. of 70% aqueous solution) and triethylamine (10 g.) were stirred vigorously. DMA diacyl chloride (7 g. in 75 ml. of methylene chloride) was added. After 15 minutes, the mixture was poured into acetone (500 ml.) and the solid polymer filtered off. It was dried in vacuo and gave a polymer having inherent viscosity of 0.47 (0.5%–60% phenol-40% tetrachloroethylene). Apparent melt point was 175° C.

Example 14.—Interfacial polycondensation

Water (150 ml.), 1,3-diamino-5,7-dimethyl adamatane (9 g.) and triethylamine (10 g.) were stirred vigorously. DMA diacyl chloride (7 g. in 75 ml. of methylene chloride) was added. After 15 minutes, the mixture was poured into acetone (500 ml.) and the solid polymer filtered off. It was dried in vacuo and gave a polymer having an inherent viscosity of 0.12. Apparent melt point was >320° C.

Example 15.—Nylon salt polymerization 1,3-dicarboxy-5,7-dimethyladamantane (12.61 g., .05 mole) and 1,4-bis(aminomethyl)cyclohexane (7.11 g., .05 mole) were dissolved in anhydrous ethanol and poured together (75 ml. anhydrous ethanol for each). A precipitate formed immediately. The mixture was cooled and the solid filtered off, washed with cold ethanol and dried at 60° C. under vacuum. The "nylon salt" (8.0 g.) was sealed in a heavy-walled glass polymerization tube under high vacuum. Care was taken to insure complete absence of oxygen. The tube was heated at 220° C. for five hours. This resulted in a nearly colorless viscous melt. The tube was opened and heated under vacuum (.07 mm. Hg) for 1.5 hours at 220° C. followed by four hours at 270° C. The light colored polyamide was slightly brittle. $\eta_{inh}$.—0.21 (0.5% and 60% phenol-40% tetrachloroethylene).

Example 16.—Film casting

A portion of the polyamide of Example 6 having a $\eta_{inh}$. of 1.49 from Table IV was dissolved in meta-cresol (10% w./v.) and poured onto a glass side. The solvent was removed by heating at 140° C. in a stream of nitrogen for two hours and then at 140° C. for two hours under vacuum. A tough coherent film was obtained which could only be detached from the glass with a razor blade.

Example 17.—Film casting

A solution of the polyamide from Example 11 having a $\eta_{inh}$. of 0.75 as shown in Table VIII in meta-cresol (10% w./v.) was prepared. Five mm. of this solution was poured into a glass plated mold (2.5″ x 3″) and the solvent removed by heating at 100–120° C. for two hours in a stream of nitrogen. The film was readily detached from the glass and was heated under vacuum for two hours at 100° C. and finally for eight hours at 140° C. A clear, tough film was obtained.

Example 18.—Moldings

The moldings for the flexural strength and flexural modulus dimensions set out in Table I are 2.5″ x 0.5″ bars prepared in molds at the pressure of 4,000 p.s.i. for five minutes at the temperatures shown in Table X.

TABLE X

| $\eta_{inh}$.: | Temp. ° C. |
|---|---|
| 0.26 | 160 |
| 0.58/0.59 | 150 |
| 1.30 | 170 |
| 1.46 | 180 |

The invention claimed is:

1. A solid linear polyamide consisting essentially of the following structural units

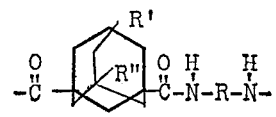

where R' and R" are monovalent hydrocarbon radicals having 1 to 20 carbon atoms, and R is a bivalent hydrocarbon radical.

2. A linear polyamide according to claim 1 wherein R is a radical having 2 to 20 carbon atoms selected from the group consisting of alkylene, cycloalkylene and arylene.

3. A linear polyamide according to claim 2 wherein R' and R" are selected from the group consisting of alkyl, cycloalkyl and aryl.

4. A linear polyamide according to claim 3 wherein R' is selected from the group consisting of methyl and ethyl and R" is selected from the group consisting of methyl and ethyl.

5. A linear polyamide according to claim 2 wherein R is an alkylene radical having 2 to 12 carbon atoms.

6. A linear polyamide according to claim 4 where R' and R" are methyl.

7. A linear polyamide acocrding to claim 6 wherein R is an alkylene radical having 2 to 12 carbon atoms.

8. A linear polyamide according to claim 6 wherein R is

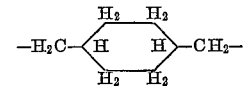

9. A linear polyamide according to claim 6 wherein R is

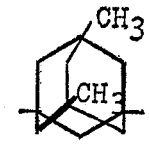

10. A linear polyamide according to claim 6 wherein R is
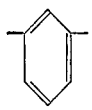
11. A linear polyamide according to claim 7 wherein R is [—C—C—C—C—C—C—]
—CH$_2$—CH$_2$—CH$_2$—CH$_2$—CH$_2$—CH$_2$—
References Cited
UNITED STATES PATENTS
| | | | |
|---|---|---|---|
| 2,972,602 | 2/1961 | Caldwell et al. | 260—78 |
| 3,053,907 | 9/1962 | Smith et al. | 260—78 |
| 3,069,468 | 12/1962 | Cox et al. | 260—78 |
| 3,301,827 | 1/1967 | Martin | 260—78 |
HAROLD D. ANDERSON, Primary Examiner
U.S. Cl. X.R.
117—161; 260—30.8, 33.4, 47